United States Patent
Terada

(10) Patent No.: US 8,980,489 B2
(45) Date of Patent: Mar. 17, 2015

(54) FUEL CELL TYPE POWER GENERATION DEVICE, ELECTRONIC APPARATUS AND TREATMENT METHOD OF FUEL

(75) Inventor: Toshihito Terada, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 1425 days.

(21) Appl. No.: 11/726,576

(22) Filed: Mar. 22, 2007

(65) Prior Publication Data

US 2007/0224475 A1     Sep. 27, 2007

(30) Foreign Application Priority Data

Mar. 27, 2006 (JP) ................... 2006-085579
Mar. 29, 2006 (JP) ................... 2006-090941

(51) Int. Cl.
*H01M 8/04* (2006.01)
*H01M 8/06* (2006.01)

(52) U.S. Cl.
CPC ........ *H01M 8/0612* (2013.01); *H01M 8/04022* (2013.01); *H01M 8/04373* (2013.01); *H01M 8/04388* (2013.01); *H01M 8/04425* (2013.01); *H01M 8/04753* (2013.01); *H01M 8/04768* (2013.01); *H01M 8/04037* (2013.01); *H01M 8/04208* (2013.01); *H01M 2250/30* (2013.01); *Y02E 60/50* (2013.01); *Y02B 90/18* (2013.01)
USPC ........... 429/429; 429/400; 429/407; 429/408; 429/433

(58) Field of Classification Search
USPC ........................................................ 429/434
See application file for complete search history.

(56) References Cited

U.S. PATENT DOCUMENTS

| | | | |
|---|---|---|---|
| 4,946,667 A | 8/1990 | Beshty | |
| 5,998,053 A | 12/1999 | Diethelm | |
| 6,514,635 B2* | 2/2003 | Van Dine et al. | 429/415 |
| 6,663,990 B2* | 12/2003 | Iio et al. | 429/413 |
| 6,869,577 B2 | 3/2005 | Ogino | |
| 6,926,748 B2* | 8/2005 | Goebel et al. | 48/127.9 |
| 7,455,921 B2 | 11/2008 | Okamoto | |
| 2002/0045078 A1* | 4/2002 | Kawasumi et al. | 429/20 |
| 2004/0053088 A1* | 3/2004 | Haga | 429/20 |
| 2004/0234829 A1* | 11/2004 | Sederquist et al. | 429/26 |
| 2004/0247960 A1* | 12/2004 | Sato et al. | 429/20 |
| 2005/0181246 A1 | 8/2005 | Nakaji | |
| 2005/0208350 A1 | 9/2005 | Isozaki et al. | |

(Continued)

FOREIGN PATENT DOCUMENTS

CN      87 1 04112 A    12/1988
CN      1173744 A       2/1998

(Continued)

OTHER PUBLICATIONS

Chinese Office Action dated Feb. 5, 2010 and English translation thereof issued in a counterpart Chinese Application No. 200710088434.1.

(Continued)

*Primary Examiner* — Ula C Ruddock
*Assistant Examiner* — Archer Dudley
(74) *Attorney, Agent, or Firm* — Holtz, Holtz, Goodman & Chick PC

(57) ABSTRACT

A fuel cell type power generation device including: a fuel cell extracting electric power by an electrochemical reaction of a fuel; a first combustor burning an unreacted fuel exhausted from the fuel cell; and a second combustor burning an unburned fuel exhausted from the first combustor.

15 Claims, 8 Drawing Sheets

(56) References Cited

U.S. PATENT DOCUMENTS

2006/0019134 A1 * 1/2006 Yagi et al. ................ 429/17
2006/0046109 A1   3/2006 Mizukami et al.

FOREIGN PATENT DOCUMENTS

| | | |
|---|---|---|
| CN | 1540790 A | 10/2004 |
| CN | 1643724 A | 7/2005 |
| JP | 7-192742 A | 7/1995 |
| JP | 9-045349 A | 2/1997 |
| JP | 10-106598 A | 4/1998 |
| JP | 2002-079058 A | 3/2002 |
| JP | 2002-117874 A | 4/2002 |
| JP | 2003-077517 A | 3/2003 |
| JP | 2003-226507 A | 8/2003 |
| JP | 2003-327405 A | 11/2003 |
| JP | 2005-166301 A | 6/2005 |
| JP | 2005-243330 A | 9/2005 |
| JP | 2005-314207 A | 11/2005 |
| JP | 2006-073218 A | 3/2006 |
| JP | 2007-254228 A | 10/2007 |
| KR | 2004-0104703 A | 12/2004 |

OTHER PUBLICATIONS

Chinese Office Action dated Apr. 6, 2009 (7 pages), and English translation thereof (7 pages), issued in counterpart Chinese Application Serial No. 2007100884341.

Korean Office Action (and English translation thereof) dated Mar. 25, 2008, issued in a counterpart Korean Application.

Japanese Office Action dated Nov. 24, 2010 (and English translation thereof) in counterpart Japanese Application No. 2006-085579.

Japanese Office Action dated Dec. 21, 2010 (and English translation thereof) in counterpart Japanese Application No. 2006-090941.

Taiwanese Office Action dated Nov. 11, 2010 (and English translation thereof) in counterpart Taiwanese Application No. 096110029.

Japanese Office Action dated Jul. 12, 2011 (and English translation thereof) in counterpart Japanese Application No. 2006-085579.

Japanese Office Action dated Mar. 12, 2013 (and English translation thereof) in counterpart Japanese Application No. 2011-156545.

* cited by examiner

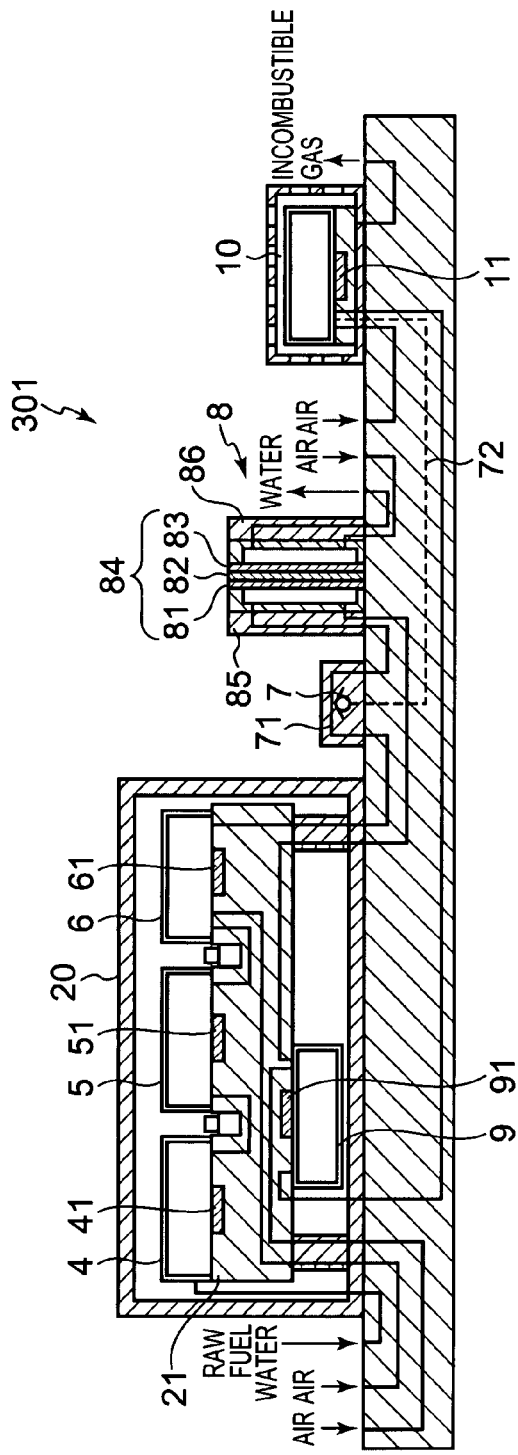
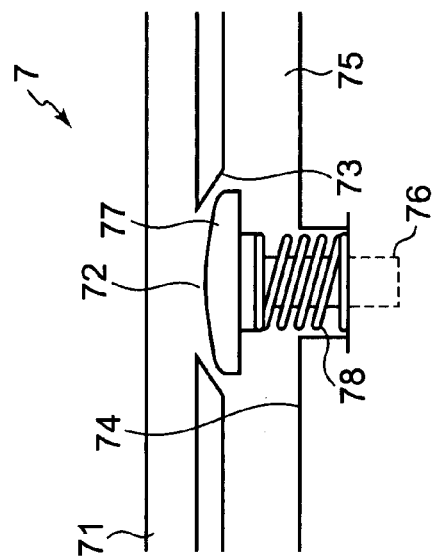
FIG. 5
FIG. 6

FUEL CELL TYPE POWER GENERATION DEVICE, ELECTRONIC APPARATUS AND TREATMENT METHOD OF FUEL

BACKGROUND OF THE INVENTION

1. Field of the Invention

The present invention relates to a fuel cell type power generation device extracting electric power by subjecting a reformed gas obtained by reforming a fuel in a reformer to an electrochemical reaction in a fuel cell (a power generation unit itself of power generation apparatus), electronic apparatus equipped with the power generation device, and a treatment method of an unreacted fuel exhausted from the fuel cell.

2. Related Art

A fuel cell is the one extracting electric power by an electrochemical reaction of a fuel, and the research and development of the fuel cell has been widely performed. The fuel used for the fuel cell is hydrogen gas, and the hydrogen gas is produced by reforming a raw fuel such as methanol in a reformer. Further, in order to enhance the utilization efficiency of energy, it has been performed to burn the unreacted hydrogen gas exhausted from a fuel cell (a power generation device itself) with a combustor such as a burner to heat the reformer by the combustion heat. Moreover, the temperature control of the reformer is performed as follows: the fuel exhausted from the fuel cell is bifurcated to be sent to another combustor, and the burning quantity of the combustor for heating the reformer is controlled by controlling the supply quantity of the fuel to the other combustor.

However, when the supply quantity of the fuel from the fuel cell (a power generation unit itself of power generation apparatus) to the other combustor is controlled, unburned fuel is sometimes exhausted from the other combustor or the combustor for heating the reformer.

Accordingly, the present invention was made in view of the problem mentioned above, and it is an object of the present invention to prevent the exhaust of unburned fuel from one or more combustors.

SUMMARY OF THE INVENTION

In accordance with a first aspect of the invention, the fuel cell type power generation device includes: a fuel cell extracting electric power by an electrochemical reaction of a fuel; a first combustor burning an unreacted fuel exhausted from the fuel cell; and a second combustor burning an unburned fuel exhausted from the first combustor.

In accordance with a second aspect of the invention, the electronic apparatus, includes: a fuel cell extracting electric power by an electrochemical reaction of a fuel; a first combustor burning an unreacted fuel exhausted from the fuel cell; a second combustor burning an unburned fuel exhausted from the first combustor; and a main body of the electronic apparatus operating by the electric power extracted by the fuel cell.

In accordance with a third aspect of the invention, the treatment method of an unreacted fuel exhausted from a fuel cell extracting electric power by an electrochemical reaction of a fuel, includes: a first burning step to burn the unreacted fuel exhausted from the fuel cell in a first combustor; and a second burning step to burn an unburned fuel exhausted from the first combustor in a second combustor.

BRIEF DESCRIPTION OF THE DRAWINGS

The above and further objects, features and advantages of the present invention will become more apparent from the following detailed description of exemplary embodiments together with the attached drawings, in which:

FIG. 1 is a block diagram showing electronic apparatus composed of a main body of the electronic apparatus and a cartridge, the main body including a fuel cell type power generation device according to a first embodiment, a load and the like;

FIG. 3 is a block diagram showing electronic apparatus composed of a main body of the electronic apparatus and a cartridge, the main body including a fuel cell type power generation device according to a second embodiment, a load and the like;

FIG. 4 is a block diagram showing electronic apparatus composed of a main body of the electronic apparatus and a cartridge, the main body including a fuel cell type power generation device according to a third embodiment, a load and the like;

FIG. 5 is a schematic sectional view showing the fuel cell type power generation device according to the third embodiment;

FIG. 6 is a view showing a relief valve used in the fuel cell type power generation device according to the third embodiment;

FIG. 7 is a block diagram showing electronic apparatus composed of a main body of the electronic apparatus and a cartridge, the main body including a fuel cell type power generation device according to a fourth embodiment, a load and the like;

FIG. 8 is a block diagram showing electronic apparatus composed of a main body of the electronic apparatus and a cartridge, the main body including a fuel cell type power generation device according to a fifth embodiment, a load and the like; and FIG. 9 is a block diagram showing electronic apparatus composed of a main body of the electronic apparatus and a cartridge, the main body including a fuel cell type power generation device according to a sixth embodiment, a load and the like.

DETAILED DESCRIPTION OF THE PREFERRED EMBODIMENTS

In the following, the preferred embodiments of the present invention will be described, referring to the attached drawings. However, although the various limitations which are technically preferable for implementing the present invention are attached to the embodiments described below, these limitations are not limit the scope of the present invention to the following embodiments and the shown examples.

[First Embodiment]

Figure 1:
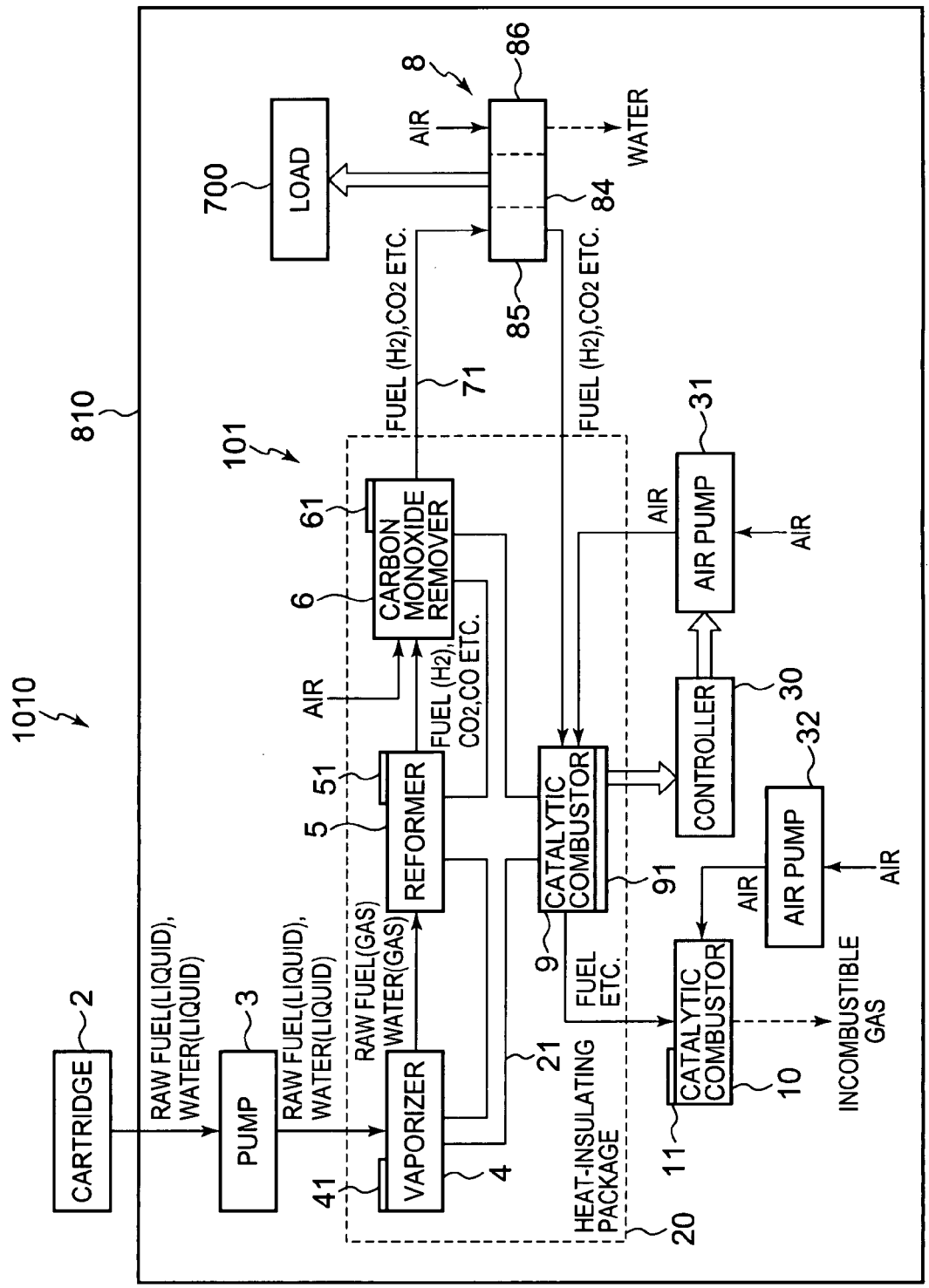
Figure 2:
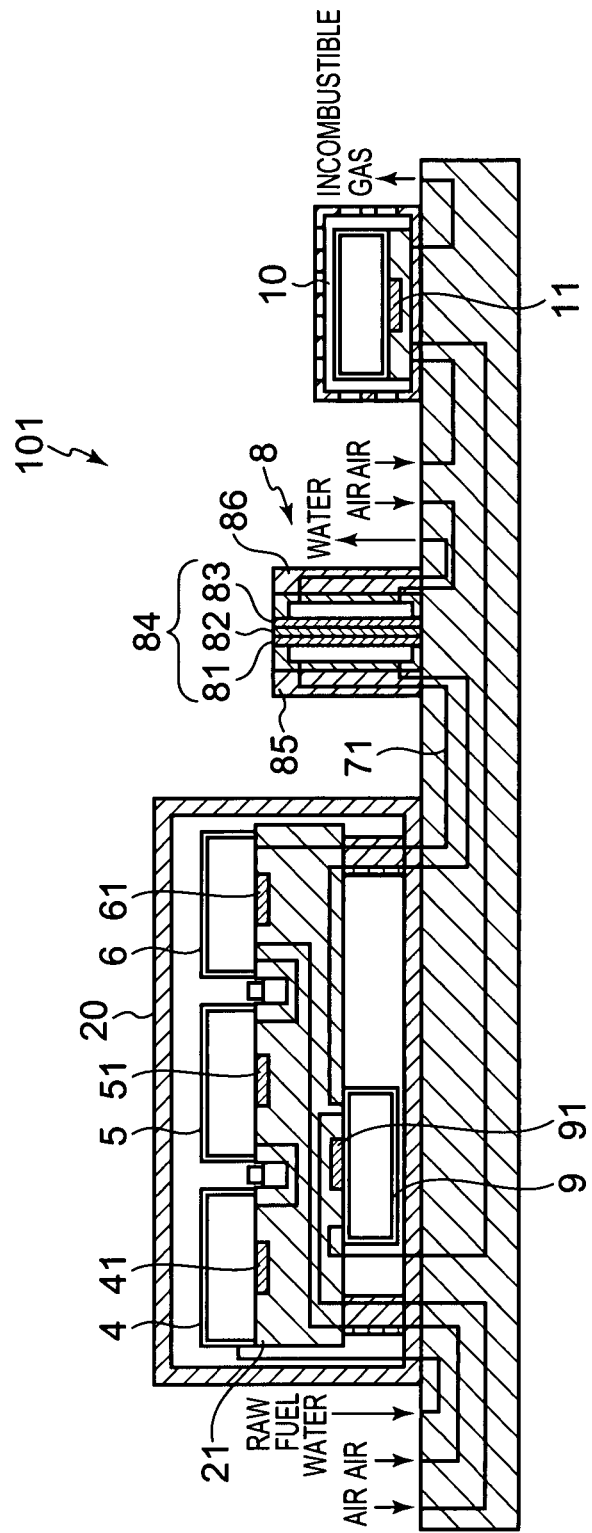
FIG. 2 is a schematic sectional view showing the fuel cell type power generation device according to the first embodiment.

FIG. 1 is a block diagram showing electronic apparatus 1010 composed of a main body 810 of the electronic apparatus and a cartridge 2, the main body 810 including a fuel cell type power generation device 101, a load 700 and the like. FIG. 2 is a schematic sectional view of the fuel cell type power generation device 101. The fuel cell type power generation device 101 is provided with a pump 3, a vaporizer 4, a reformer 5, a carbon monoxide remover 6, a fuel cell (the main body of the fuel cell) 8, a first catalytic combustor 9, a second catalytic combustor 10, a controller 30, and air pumps 31 and 32. The fuel cell type power generation device 101 is mounted on electronic apparatus 1000 such as a notebook-size personal computer, a personal digital assistant (PDA), an electronic databook, a digital camera, a mobile phone, a wrist watch, a register and a projector, and the like. The pump 3, the vaporizer 4, the reformer 5, the carbon monoxide remover 6, the fuel cell 8, the first catalytic combustor 9, the second catalytic combustor 10, the controller 30, and the first and the second air pumps 31 and 32 are built in the main body 810 of the electronic apparatus, and the cartridge 2 is attached on the main body 810 of the electronic apparatus in a detachable state. When the cartridge 2 is attached to the main body 810 of the electronic apparatus, the cartridge 2 is connected to the pump 3. Moreover, the load 700 is also built in the main body 810 of the electronic apparatus. The details of the load 700 will be described later.

The cartridge 2 reserves therein a liquid raw fuel (such as methanol, ethanol or dimethyl ether) and water in the state of being mixed or being separate.

The pump 3 is the one sucking the raw fuel and the water in the cartridge 2 to send the liquid mixture of the raw fuel and the water to the vaporizer 4.

The vaporizer 4 is provided with an electric-heater/temperature-sensor 41 made of an electric heating material. The electric-heater/temperature-sensor 41 generally has an electric resistance value depending on temperature, and also functions as a temperature sensor. The liquid mixture sent from the pump 3 to the vaporizer 4 is vaporized by the heat of the electric-heater/temperature-sensor 41 and the heat of the first catalytic combustor 9. The gaseous mixture vaporized in the vaporizer 4 is sent to the reformer 5.

The reformer 5 is provided with an electric-heater/temperature-sensor 51 made of an electric heating material having an electric resistance value depending on a temperature. A flow path is formed in the inner part of the reformer 5, and a catalyst is supported on the wall surface of the flow path. The gaseous mixture sent from the vaporizer 4 to the reformer 5 flows through the flow path of the reformer 5, and is heated by the electric-heater/temperature-sensor 51 and the first catalytic combustor 9 to be reacted by the catalyst. Hydrogen and carbon dioxide (and infinitesimal carbon monoxide and the like, which are by-products to be described later) as a fuel are produced by the catalytic reaction of the raw fuel and the water. Incidentally, when the raw fuel is methanol, a reaction expressed by the next formula (1) is mainly caused in the reformer 5.

$$CH_3OH + H_2O \rightarrow 3H_2 + CO_2 \quad (1)$$

The carbon monoxide is infinitesimally produced as a by-product in accordance with a formula such as the following formula (2), which is sequentially caused subsequently to the chemical reaction formula (1).

$$H_2 + CO_2 \rightarrow H_2O + CO \quad (2)$$

The carbon monoxide remover 6 is provided with an electric-heater/temperature-sensor 61 made of an electric heating material having an electric resistance value depending on temperature. A flow path is formed in the inner part of the carbon monoxide remover 6, and a catalyst is supported on the wall surface of the flow path. The reformed gas produced in the reformer 5 is sent to the carbon monoxide remover 6. Furthermore, external air is sent to the carbon monoxide remover 6. The reformed gas sent from the reformer 5 to the carbon monoxide remover 6 is mixed with the air to flow through the flow path of the carbon monoxide remover 6, and is heated by the electric-heater/temperature-sensor 61 and the first catalytic combustor 9. Then, the carbon monoxide in the reformed gas is preferentially oxidized by the catalyst in accordance with the following formula (3). Thereby, carbon dioxide is produced, and the carbon monoxide is removed from the reformed gas. For example, the density of the carbon monoxide in the reformed gas becomes 10 ppm or less.

$$2CO + O_2 \rightarrow 2CO_2 \quad (3)$$

The vaporizer 4, the reformer 5 and the carbon monoxide remover 6 are contained in a box-like heat-insulating package 20. The atmospheric pressure in the heat-insulating package 20 is kept to be a vacuum pressure (for example, 10 Pa or less).

The fuel cell 8 is composed of an electrolyte film 82, an anode film 81 joined on a one side surface of the electrolyte film 82, a cathode film 83 joined on the other side surface of the electrolyte film 82, an anode separator 85 joined to the anode film 81 to form a flow path on the joint surface, and a cathode separator 86 joined to the cathode film 83 to form a flow path on the joint surface. The structure made by joining the electrolyte film 82, the anode film 81 and the cathode film 83 is a membrane electrode assembly 84.

The reformed gas exhausted from the carbon monoxide remover 6 is sent to the flow path of the anode separator 85 of the fuel cell 8 through a pipe arrangement 71. Air is sent to the flow path of the cathode separator 86 on the other side. Then, the hydrogen in the reformed gas supplied to the anode film 81 electrochemically reacts with the oxygen in the air supplied to the cathode film 83 through the cathode film 83, and consequently electric power is generated between the anode film 81 and the cathode film 83. Incidentally, in a case that the electrolyte film 82 is an electrolyte film having the property of hydrogen ion permeability (for example, a solid polymer electrolyte), the reaction as the following formula (4) is caused in the anode film 81, and hydrogen ions produced in the anode film 81 permeate the electrolyte film 82. Then, the reaction as expressed by the following formula (5) is caused in the cathode film 83.

$$H_2 \rightarrow 2H^+ + 2e^- \quad (4)$$

$$2H^+ + \tfrac{1}{2}O_2 + 2e^- \rightarrow H_2O \quad (5)$$

The anode film 81 and the cathode film 83 are connected to the load 700 (such as a motor, a display unit, a DC-DC converter, a secondary battery and the like, and a control unit controlling them), which is operated by the electric power taken out from the fuel cell 8.

The reformed gas which has passed through the flow path of the anode separator 85 also includes unreacted hydrogen. Then, the exhausted reformed gas which has exhausted through the flow path of the anode separator 85 is supplied to the first catalytic combustor 9. Furthermore, external air is sucked by the air pump 31 to be supplied to the first catalytic combustor 9. A motor fan or the like is used as the air pump 31.

The first catalytic combustor 9 is provided with an electric-heater/temperature-sensor 91 made of an electric heating material. Because the electric resistance value of the electric-heater/temperature-sensor 91 depends on temperature, the electric-heater/temperature-sensor 91 also functions as a temperature sensor for measuring the temperature of the first catalytic combustor 9, and the temperature measured by the electric-heater/temperature-sensor 91 is input into the controller 30 as an electric signal.

A flow path is formed in the inner part of the first catalytic combustor 9, and a catalyst is supported on the wall surface of the flow path. The exhausted reformed gas sent from the anode separator 85 to the first catalytic combustor 9 is mixed with the air, and flows through the flow path in the first catalytic combustor 9 to be heated by the electric heater and the temperature sensor 91. The hydrogen in the exhausted reformed gas flowing through the flow path of the first catalytic combustor 9 is burnt by the catalyst to generate combustion heat. The first catalytic combustor 9 is contained in the heat-insulating package 20, and the combustion heat generated in the first catalytic combustor 9 is used for the vaporization in the vaporizer 4, the reforming reaction in the reformer 5, and the selective oxidation reaction in the carbon monoxide remover 6. In the heat-insulating package 20, the vaporizer 4, the reformer 5, the carbon monoxide remover 6 and the first catalytic combustor 9 are mounted so as to touch a heat conduction member 21, and the combustion heat of the first catalytic combustor 9 conducts to the vaporizer 4, the reformer 5 and the carbon monoxide remover 6 by the heat conduction member 21.

The exhausted reformed gas is supplied from the first catalytic combustor 9 to the second catalytic combustor 10, and external air is supplied to the second catalytic combustor 10 by the air pump 32. As the air pump 32, a motor fan or the like is used. The second catalytic combustor 10 is provided with an electric-heater/temperature-sensor 11 made of an electric heating material having an electric resistance value depending on temperature, and the electric-heater/temperature-sensor 11 also functions as a temperature sensor. A flow path is formed in the inner part of the second catalytic combustor 10, and a catalyst is supported on the wall surface of the flow path. The second catalytic combustor 10 is located on the outside of the heat-insulating package 20.

The exhausted reformed gas sent from the first catalytic combustor 9 to the second catalytic combustor 10 is mixed with air, and flows through the flow path of the second catalytic combustor 10 to be heated by the electric-heater/temperature-sensor 11. The hydrogen in the exhausted reformed gas flowing through the flow path of the second catalytic combustor 10 is burned by the catalyst. Thereby, the infinitesimal hydrogen included in the exhausted reformed gas sent from the first catalytic combustor 9 is removed, and the exhausted reformed gas flowing through the flow path of the second catalytic combustor 10 is discharged to the outside.

The controller 30 has a function of inputting an electric signal indicating a measured temperature by the electric-heater/temperature-sensor 91 therein from the electric-heater/temperature-sensor 91, and a control function of controlling the supply quantity of the air of the air pump 31 according to the measured temperature input from the electric-heater/temperature-sensor 91. The control function of the controller 30 includes a comparison function of comparing the measured temperature of the electric-heater/temperature-sensor 91 with a predetermined value, a function of increasing the supply quantity of the air of the air pump 31 to be more than a predetermined certain quantity when the measured temperature of the electric-heater/temperature-sensor 91 is less than the predetermined value as a result of the comparison, and a function of decreasing the supply quantity of the air of the air pump 31 to be less than the certain quantity when the measured temperature of the electric-heater/temperature-sensor 91 is higher than the predetermined value as a result of the comparison. In a case that the controller 30 is a computer, each function of the controller 30 may be realized by the operation of the controller 30 of reading a program stored in a storage medium. Each function of the controller 30 may be also realized by combining various logic circuits.

Next, the operations of the fuel cell type power generation device 101 will be described, and the treatment method of the hydrogen in the exhausted reformed gas exhausted from the anode of the fuel cell 8 will be described.

In the state in which electric power is supplied to the electric-heater/temperature-sensors 41, 51, 61, 91 and 11, and in which the electric-heater/temperature-sensors 41, 51, 61, 91 and 11 generate heat, the pump 3 operates, and the air pump 32 operates, and further the air pump 31 is operated by the controller 30. The solution of the raw fuel and the water is sent by the pump 3, and a flow from the vaporizer 4 to the second catalytic combustor 10 through the reformer 5, the carbon monoxide remover 6, the anode (anode separator 85) of the fuel cell 8, and the first catalytic combustor 9 is brought about. The raw fuel and the water vaporize in the vaporizer 4; a reformed gas is produced in the reformer 5 from the raw fuel and the water; the carbon monoxide in the reformed gas is removed in the carbon monoxide remover 6; electric power is taken out from the fuel cell 8 by the electrochemical reaction of the hydrogen in the reformed gas; the hydrogen in the exhausted reformed gas, which has not been used for power generation to remain therein, burns in the first catalytic combustor 9; and the residual infinitesimal hydrogen which has not burned in the first catalytic combustor 9 burns in the second catalytic combustor 10.

Then, the operating states of the vaporizer 4, the reformer 5, the carbon monoxide remover 6, the fuel cell 8, the first catalytic combustor 9 and the second catalytic combustor 10 become stable; the flow of the reformed gas and the like becomes stable; and the fuel cell 8 operates in a stable power generation state. In the stable power generation state, it is possible to stop the supply of electric power for making each of the electric-heater/temperature-sensors 41, 51, 61, 91 and 11 operate as a heater. In such a stable state, the measured temperature of the electric-heater/temperature-sensor 91 is a predetermined value (designed value), and the controller 30, to which the measured temperature is input, keeps the supply quantity of the air of the air pump 31 to a predetermined certain quantity. The certain quantity is set to be less than the quantity at which all of the hydrogen in the exhausted reformed gas sent from the fuel cell 8 to the first catalytic combustor 9 is burned. Consequently, even when almost 100% of the oxygen in the air supplied by the air pump 31 is used for the burning of the hydrogen, a part of the hydrogen in the exhausted reformed gas remains not to be burned in the first catalytic combustor 9. For example, when it is supposed that power generation is performed at the consumption rate of the hydrogen of 80% in the state in which the fuel cell 8 is operating in a certain power generation state, then 20% of unreacted hydrogen is sent to the first catalytic combustor 9. Then, a certain quantity of air is sent so that, for example, 18% of hydrogen may be burned in the first catalytic combustor 9, and the residual 2% of hydrogen is sent to the second catalytic combustor 10.

As described above, the air supply quantity of the air pump 31 is controlled to be a certain quantity in the stable power generation state by the controller 30, and the burning quantity of the hydrogen in the first catalytic combustor 9 is thereby controlled. Thus, the temperature control in the heat-insulating package 20 can be easily performed. In the stable state, the sufficient quantity of air for burning all of the hydrogen in the exhausted reformed gas sent to the second catalytic combustor 10 is supplied to the second catalytic combustor 10 by the air pump 32. Consequently, no hydrogen is included in the gaseous mixture exhausted to the outside, and the gaseous mixture is an incombustible gas.

When the power consumption quantity of the load 700 reduces in a state that the fuel cell 8 operates at a stationary power generation quantity and the system is stable, the power generation quantity of the fuel cell 8 reduces and the rate of the hydrogen consumed in the fuel cell 8 (consumption rate) reduces. Consequently, the density of the hydrogen in the exhausted reformed gas sent from the fuel cell 8 to the first catalytic combustor 9 increases. However, because only a certain quantity of the air (for the case at the time of stationary power generation) supplied to the first catalytic combustor 9 by the air pump 31 is supplied, even when the density of the hydrogen sent to the first catalytic combustor 9 has risen, the burning quantity of the hydrogen does not change, and the temperature of the first catalytic combustor 9 does not rise. Then, the hydrogen density in the exhausted reformed gas supplied from the first catalytic combustor 9 to the second catalytic combustor 10 increases. For example, when the consumption rate of the hydrogen of the fuel cell 8 reduces from 80% to 60%, 40% of unreacted hydrogen is sent to the first catalytic combustor 9, and 18% of hydrogen is burned in the first catalytic combustor 9, and further the residual 22% of hydrogen is sent to the second catalytic combustor 10. However, because the sufficient quantity of air has been supplied to the second catalytic combustor 10, all of the hydrogen is burned in the second catalytic combustor 10.

On the contrary, when the power consumption quantity of the load 700 increases in the case that the fuel cell 8 operates at a certain power generation quantity and the system is stable, the power generation quantity of the fuel cell 8 increases, and the rate of the hydrogen consumed by the fuel cell 8 (consumption rate) increases. Consequently, the density of the hydrogen in the exhausted reformed gas sent from the fuel cell 8 to the first catalytic combustor 9 falls. However, when the density of the hydrogen is within an allowable range (a density at which a certain quantity of air supplied to the first catalytic combustor 9 by the air pump 31 can be consumed, or more), it is possible not to change the burning quantity of the hydrogen, and the temperature of the first catalytic combustor 9 does not change. Then, the residual hydrogen which has not been burned in the first catalytic combustor 9 is sent to the second catalytic combustor 10, and all of the hydrogen is burned in the second catalytic combustor 10 because the sufficient quantity of air is supplied to the second catalytic combustor 10.

As described above, even when the density of the hydrogen sent to the first catalytic combustor 9 and the second catalytic combustor 10 changes, the air supply quantity of the air pump 31 is controlled to a certain quantity by the controller 30, and consequently the burning quantity of the hydrogen in the first catalytic combustor 9 is controlled. Thus, the temperature control in the heat-insulating package 20 can be easily performed. Moreover, even when the density of the hydrogen sent to the first catalytic combustor 9 and the second catalytic combustor 10 has risen, because the sufficient quantity of air is supplied to the second catalytic combustor 10, all of the hydrogen is burned in the second catalytic combustor 10. Because the second catalytic combustor 10 is located on the outside of the heat-insulating package 20 at this time, no influence is exerted on the temperature control of the reforming unit including the reformer.

In a case of reducing the solution sending quantity of the pump 3 when the fuel cell 8 operates at a certain power generation quantity and the system is stable, because the vaporizer 4, the reformer 5 and the carbon monoxide remover 6 perform an endothermic reaction as the whole, the temperature in the heat-insulating package 20 rises. As a result, the measured temperature of the electric-heater/temperature-sensor 91 becomes higher than a predetermined value, and the controller 30 having received the input of the measured temperature reduces the supply quantity of the air of the air pump 31 to be below the certain quantity. Accordingly, the heat quantity by the burning can be reduced, and the temperature rise in the heat-insulating package 20 can be suppressed. Moreover, the hydrogen burned in the first catalytic combustor 9 decreases, and the density of the hydrogen supplied from the first catalytic combustor 9 to the second catalytic combustor 10 becomes high. However, even when the density of the hydrogen sent to the second catalytic combustor 10 becomes high, because the sufficient amount of air is supplied to the second catalytic combustor 10, all of the hydrogen sent to the second catalytic combustor 10 is burned in the second catalytic combustor 10. Further, even when the production quantity of hydrogen becomes little and the temperature in the heat-insulating package 20 rises, because the air supply quantity of the air pump 31 is controlled to be lower than the certain quantity by the controller 30 as described above, the burning quantity of the hydrogen in the first catalytic combustor 9 is controlled. As a result, the temperature rise in the heat-insulating package 20 can be suppressed, and the temperature control can be easily performed.

On the contrary, in the case that the solution sending quantity of the pump 3 is increased when the fuel cell 8 operates at a certain power generation quantity and the system is stable, because the vaporizer 4, the reformer 5 and the carbon monoxide remover 6 perform an endothermic reaction as the whole, the temperature in the heat-insulating package 20 reduces. As a result, the measured temperature of the electric-heater/temperature-sensor 91 becomes less than the predetermined value, and the controller 30 having received the input of the measured temperature sets the supply quantity of the air of the air pump 31 to be more than the certain quantity. Accordingly, the heat quantity by burning can be increased, and the reduction of the temperature in the heat-insulating package 20 can be suppressed. Then, the residual hydrogen which has not been burned in the first catalytic combustor 9 is sent to the second catalytic combustor 10, and all of the hydrogen is burned in the second catalytic combustor 10 because the sufficient quantity of air is supplied to the second catalytic combustor 10.

In the present embodiment, because all of the hydrogen which has not burned in the first catalytic combustor 9 is burned in the second catalytic combustor 10, it is possible to prevent the ejection of any combustible exhaust gas from the second catalytic combustor 10, and the safety of the fuel cell type power generation device 101 is improved. Further, because the second catalytic combustor 10 is located on the outside of the heat-insulating package 20, it is possible not to exert any influence on the temperature control of the reforming unit including the reformer, and stable power generation can be performed.

Because the present embodiment controls the burning quantity of the hydrogen in the first catalytic combustor 9 by controlling the air supply quantity of the air pump 31 without controlling the flow rate of the exhausted reformed gas sent from the fuel cell 8 to the first catalytic combustor 9, the temperature control in the heat-insulating package 20 can be performed by a simple construction.

When the solution sending quantity of the pump 3 is changed as the need arises according to the power generation quantity of the fuel cell 8, the production quantity of hydrogen changes, and also the density of the hydrogen sent from the anode of the fuel cell 8 to the first catalytic combustor 9 changes. However, because the present embodiment can control the burning quantity of the hydrogen in the first catalytic combustor 9 only by controlling the air supply quantity of the air pump 31 regardless of the changes of the density of the hydrogen sent from the anode of the fuel cell 8 to the first catalytic combustor 9, the controllability of the temperature control in the heat-insulating package 20 is good, and the supply quantities of the raw fuel and the water by the pump 3 can be changed in a short time.

The present invention is not limited to the embodiment described above, but various improvements and modifications of design may be performed without departing from the sprit of the present invention.

[Second Embodiment]

The first embodiment described above has been described with regard to the example of the case where the catalytic combustor provided in the heat-insulating package 20 is one of the first catalytic combustor, but, for example, the catalytic combustor may be ones separately provided for the vaporizer 4, for the reformer 5, for the carbon monoxide remover 6 and the like.

Figure 3:
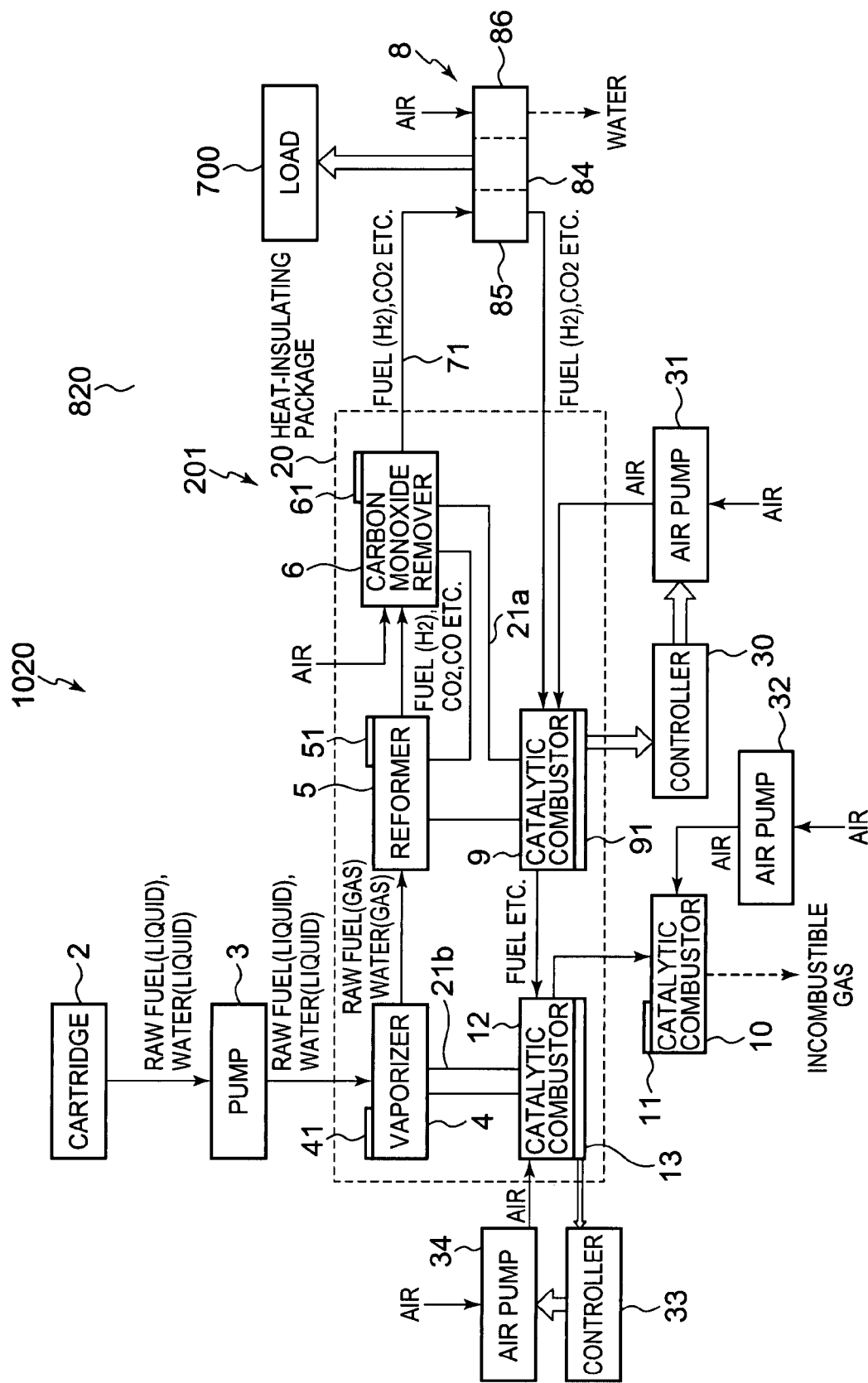

FIG. 3 shows another configuration example as a fuel cell type power generation device 201.

FIG. 3 is the configuration example of the case where two catalytic combustors are provided in the heat-insulating package 20. Incidentally, the same reference marks are given to the same constituent elements as those shown in FIG. 1, and their descriptions are simplified.

The first catalytic combustor is used as the one dedicated for the reformer 5 and the carbon monoxide remover 6, and another catalytic combustor 12 for a vaporizer, which is dedicated for the vaporizer 4, is provided in the heat-insulating package 20, and the heat conduction member is separately formed as the heat conduction members 21a and 21b.

The catalytic combustor 12 for a vaporizer is provided with an electric-heater/temperature-sensor 13 made of an electric heating material similarly to the other catalytic combustors. Because the electric resistance value of the electric-heater/temperature-sensor 13 depends on temperature, the electric-heater/temperature-sensor 13 also functions as a temperature sensor for measuring the temperature of the catalytic combustor 12 for a vaporizer, and the temperature measured by the electric-heater/temperature-sensor 13 is input into a controller 33 as an electric signal.

The exhausted reformed gas which has passed through the flow path of the anode separator 85 and is exhausted from the flow path is supplied to the first catalytic combustor 9, and the hydrogen of the quantity for supplying the heat quantity for the reformer 5 and the carbon monoxide remover 6 in the exhausted reformed gas is mix with air of a proper quantity by the control of the controller 30 to be burned in the first catalytic combustor 9.

Then, the exhausted reformed gas from there is supplied to the catalytic combustor 12 for a vaporizer with unburned hydrogen left. Furthermore, external air is sucked by the air pump 34 to be supplied to the catalytic combustor 12 for a vaporizer.

The controller 33, similarly to the case of the first catalytic combustor, includes the function of inputting an electric signal indicating the measured temperature by the electric-heater/temperature-sensor 13 therein from the electric-heater/temperature-sensor 13, and the control function of controlling the supply quantity of air by the air pump 34 in accordance with the measured temperature input from the electric-heater/temperature-sensor 13. The control function of the controller 33 includes the comparison function of comparing the measured temperature of the electric-heater/temperature-sensor 13 with a predetermined value, the function of increasing the supply quantity of air of the air pump 34 than a predetermined certain quantity when the measured temperature of the electric-heater/temperature-sensor 13 is less than the predetermined value as a result of the comparison, and the function of lowering the supply quantity of air of the air pump 34 than the certain quantity when the measured temperature of the electric-heater/temperature-sensor 13 is higher than the predetermined value as a result of the comparison.

In the catalytic combustor 12 for a vaporizer, the exhausted reformed gas in the state of including the residual unburned hydrogen, which has been supplied from the first catalytic combustor, is mixed with a proper quantity of air to be burned by the quantity for supplying the heat quantity for the vaporizer 4 by the control of the controller 33.

Although the heat quantities of the vaporizer, the reformer and the carbon monoxide remover are controlled by one first catalytic combustor 9 in the first embodiment, the first catalytic combustor 9 and the catalytic combustor 12 for a vaporizer are serially arranged to enable the individual control of the heat quantities in the second embodiment.

The adoption of such a configuration enables more accurate management of the temperature of the vaporizer 4, the reformer 5, and the temperature of the carbon monoxide remover 6.

Then, the configuration is made to send the exhausted reformed gas including the residual surplus hydrogen which has not burned in the two catalytic combustors mentioned above to the second catalytic combustor 10 provided on the outside of the heat-insulating package 20.

Because the sufficient amount of air is supplied to the second catalytic combustor 10, all of the hydrogen is burned in the second catalytic combustor 10.

Consequently, it is possible to prevent the ejection of any combustible exhaust gas from the second catalytic combustor 10 similarly in the first embodiment, and the safety of the embodiment is improved.

Although the cases of supplying air to the catalytic combustors have been described for simplification in each embodiment described above, the material to be supplied is not limited to the air, and any gasses containing an oxidizer such as oxygen can be used.

When the electric power quantity taken out from the fuel cell (the main body of the fuel cell) rapidly reduces from the stable power generation state, the pressure loss in the flow path in the fuel cell becomes larger, or the pressure loss in the catalytic combustor and the like located in the downstream of the fuel cell become larger by the influence of the decrease of the quantity of the hydrogen gas consumed in the fuel cell. Consequently, the pressure in the reformer, which is located on the upper stream of the fuel cell, rapidly rises. There is also the problem that owing to such a sudden rise of the pressure, the counter flow of the gas, the reduction of the flow rate of the gas and the like are compositely produced, and that the operation of the whole device becomes unstable.

[Third Embodiment]

Figure 4:
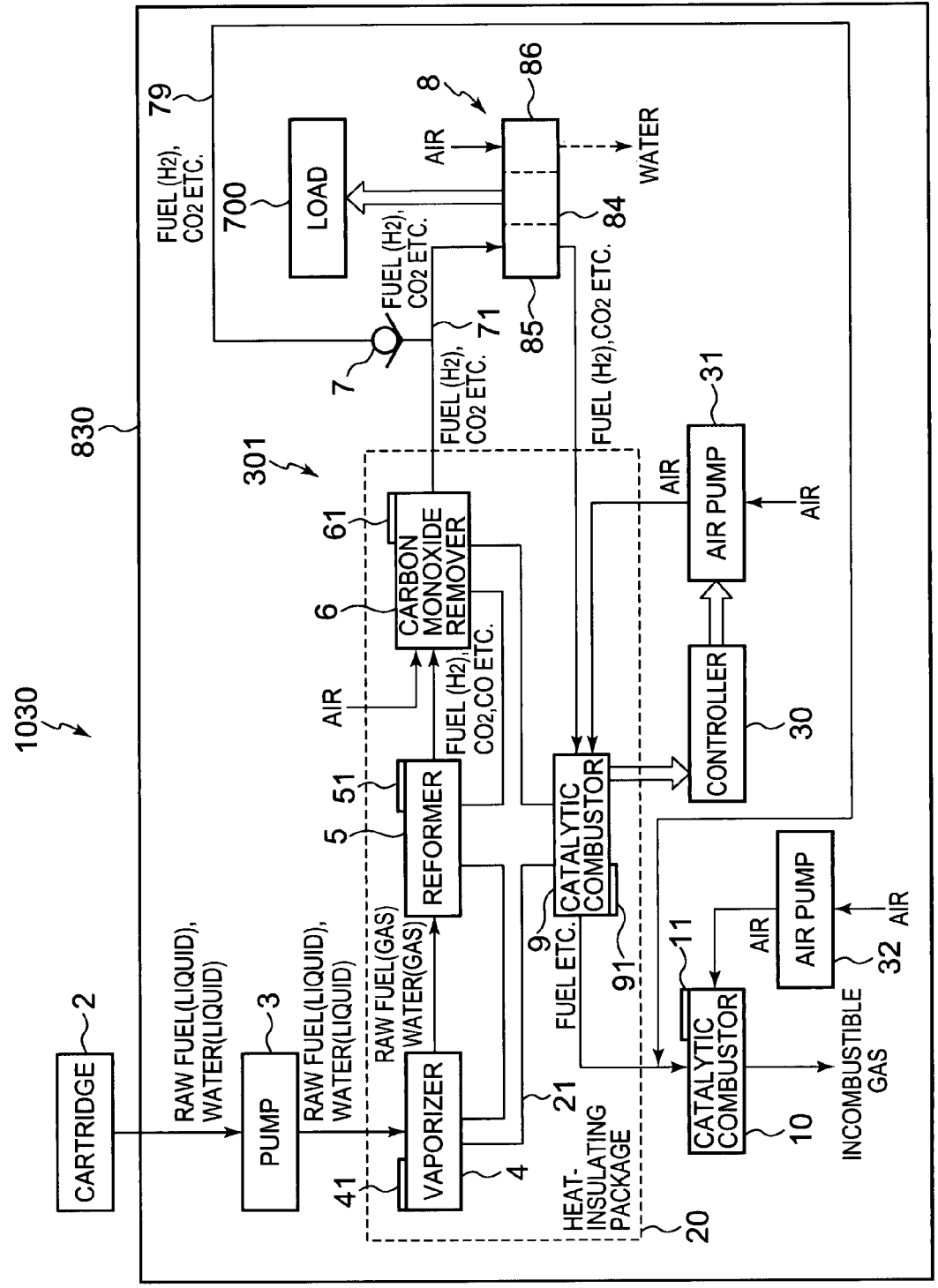

FIG. 4 is a block diagram showing electronic apparatus 1030 composed of a main body 830 of the electronic apparatus and the cartridge 2, the main body 830 including a fuel cell type power generation device 301 according to a third embodiment, a load 700 and the like. FIG. 5 is a schematic sectional view showing the fuel cell type power generation device 301. The fuel cell type power generation device 301 is provided with the pump 3, the vaporizer 4, the reformer 5, the carbon monoxide remover 6, a relief valve 7, the fuel cell (the main body of the fuel cell) 8, the first catalytic combustor 9, the second catalytic combustor 10, the controller 30, the air pump 31 and the air pump 32.

Because the units of the cartridge 2, the pump 3, the vaporizer 4, the reformer 5, the carbon monoxide remover 6, the fuel cell (the main body of the fuel cell) 8, the first catalytic combustor 9, the second catalytic combustor 10, the controller 30, the air pump 31, the air pump 32 and the load 700 are similar to those of the first and the second embodiments, their descriptions are omitted.

In the third embodiment, the pipe arrangement 71 between the carbon monoxide remover 6 and the anode of the fuel cell 8 is provided with the relief valve 7. The relief valve 7 is the valve which opens when the pressure of the reformed gas flowing through the pipe arrangement 71 from the carbon monoxide remover 6 to the fuel cell 8 becomes equal to a predetermined value (for example, 10 kPa) or more to allow the reformed gas in the pipe arrangement 71 to escape.

FIG. 6 shows an example of the relief valve 7. As shown in FIG. 6, an orifice 72 is formed in the pipe arrangement 71, and a valve seat 73 is formed around the orifice 72 on the peripheral surface of the pipe arrangement 71. Moreover, a housing 74 is provided on the outside of the pipe arrangement 71, and a space 75 is formed around the orifice 72 by the housing 74. A shaft 76 is provided on the housing 74, and the shaft 76 protrudes into the inside of the housing 74, which enables the shaft 76 to move in the axis line direction thereof. A valve element 77 is attached to the tip of the shaft 76, and a spring 78 is wound around the shaft 76. The valve element 77 is urged toward the valve seat 73 by the spring 78. The space 75 communicates with the second catalytic combustor 10 as shown in FIG. 4 with a pipe arrangement 79.

In such a mechanical passive relief valve 7, when the pressure of the reformed gas flowing through the pipe arrangement 71 is less than a predetermined value, the valve element 77 is pushed against the valve seat 73 by the elastic force of the spring 78, and the orifice 72 is blocked by the valve element 77. On the other hand, when the pressure of the reformed gas flowing through the pipe arrangement 71 becomes the predetermined value or more, the valve element 77 is separated from the valve seat 73 against the elastic force of the spring 78 by the pressure. Consequently, the orifice 72 is opened, and the reformed gas in the pipe arrangement 71 flows into the space 75 and into the second catalytic combustor 10 by the pipe arrangement 79. In the second catalytic combustor 10, the hydrogen in the gaseous mixture including infinitesimal hydrogen, which gaseous mixture has flowed from the relief valve 7, is burned.

As described above, when the fuel cell 8 suddenly stops from the stable power generation state, or when the output suddenly drops owing to a load change, the relief valve 7 opens, and thereby it is suppressed that the pressures in the carbon monoxide remover 6, the reformer 5, the vaporizer 4, which are located on the upper stream of the fuel cell 8, suddenly rise. Consequently, the flow of the gas of the fuel cell type power generation device 301 becomes stable, and the operation of the whole device also becomes stable.

Moreover, the surplus of the reformed gas exhausted from the relief valve 7 is sent to the second catalytic combustor 10, and the hydrogen in the reformed gas is burned in the second catalytic combustor 10. Consequently, the gas exhausted from the fuel cell type power generation device 301, i.e. the gas exhausted from the second catalytic combustor 10, becomes an incombustible gas. Thus, the safety of the fuel cell type power generation device 301 can be secured.

[Fourth Embodiment]

Figure 7:
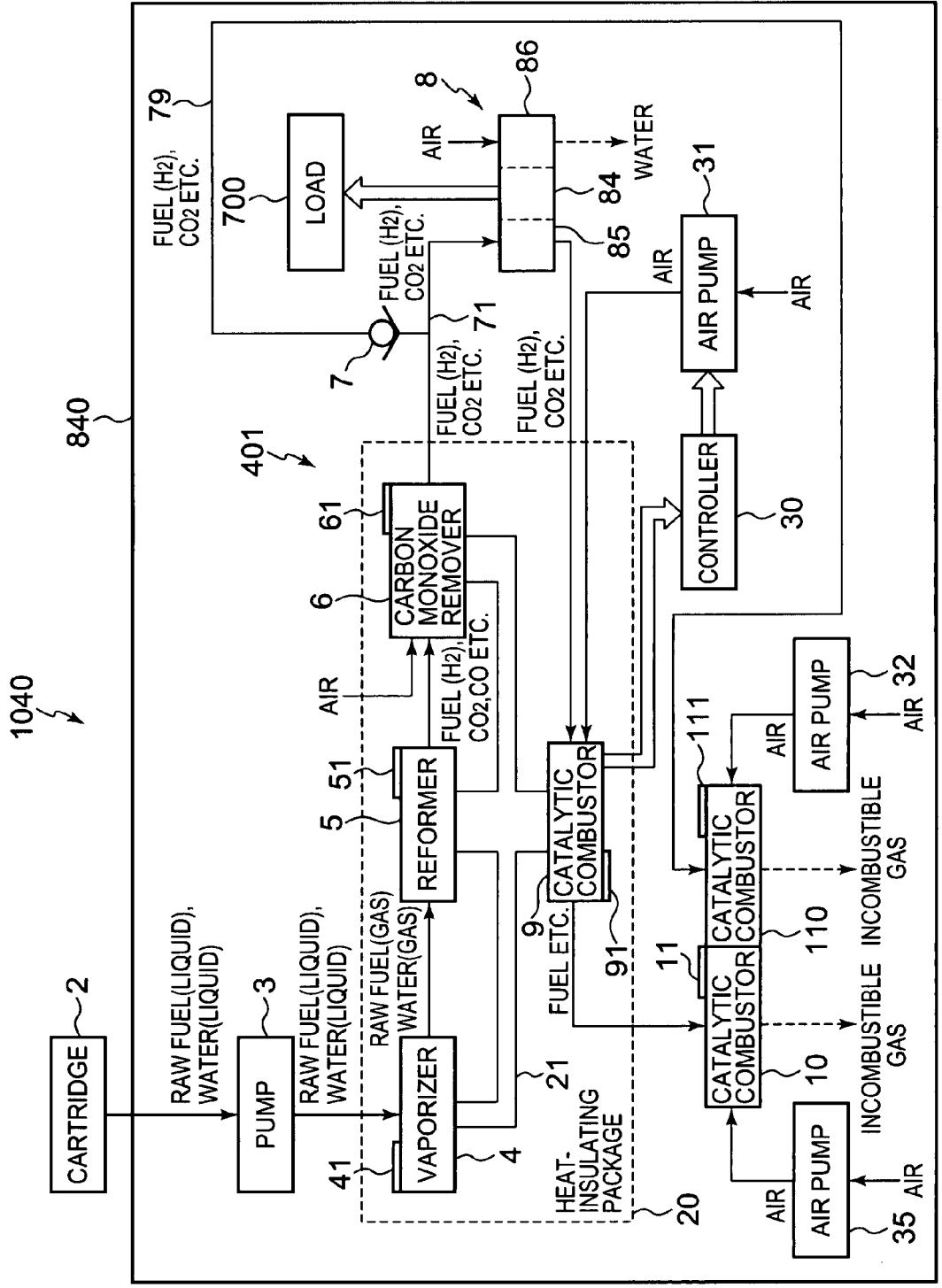

FIG. 7 is a block diagram showing electronic apparatus 1040 composed of a main body 840 of the electronic apparatus and the cartridge 2, the main body 840 including a fuel cell type power generation device 401 according to a fourth embodiment, the load 700 and the like. The fuel cell type power generation device 401 is provided with a third catalytic combustor 110 in addition to each constituent element of the fuel cell type power generation device 301 of the third embodiment. The third catalytic combustor 110 is provided with an electric heater 111 made of an electric heating material having an electric resistance value depending on temperature. A flow path is formed in the inner part of the third catalytic combustor 110, and a catalyst is supported on the wall surface of the flow path. Moreover, the third catalytic combustor 110 is located on the outside of the heat-insulating package 20.

The pipe arrangement 79 is not connected to the second catalytic combustor 10, but is connected to the third catalytic combustor 110. Consequently, when the pressure of the reformed gas flowing through the pipe arrangement 71 becomes the predetermined value or more and the relief valve 7 opens, the surplus of the reformed gas flows from the relief valve 7 to the third catalytic combustor 110. Then, the oxygen in the air supplied from the outside to the third catalytic combustor 110 by the air pump 32 and the hydrogen in the reformed gas supplied from the relief valve 7 to the third catalytic combustor 110 react with each other, and the hydrogen is removed.

By adopting such a configuration, because the third catalytic combustor 110 is separately provided, the pressure loss change of the second catalytic combustor 10 when the relief valve 7 opens and the reformed gas flows can be suppressed.

Further, because the third catalytic combustor 110 is provided to be adjacent to the second catalytic combustor 10 and is thermally contacted with the second catalytic combustor 10, it is possible to keep the third catalytic combustor 110 at a temperature at which the third catalytic combustor 110 can perform catalyst burning without any waste always using the heat of the electric heater 11 of the second catalytic combustor 10. Consequently, the third catalytic combustor 110 is made to start the catalyst burning at the moment when the relief valve 7 opens and the reformed gas enters therein. Moreover, although the electric heater 111 is separately formed from the electric heater 11 in the embodiment shown in FIG. 7, one electric heater may be commonly used as the electric heater 111 and the electric heater 11.

[Fifth Embodiment]

Figure 8:
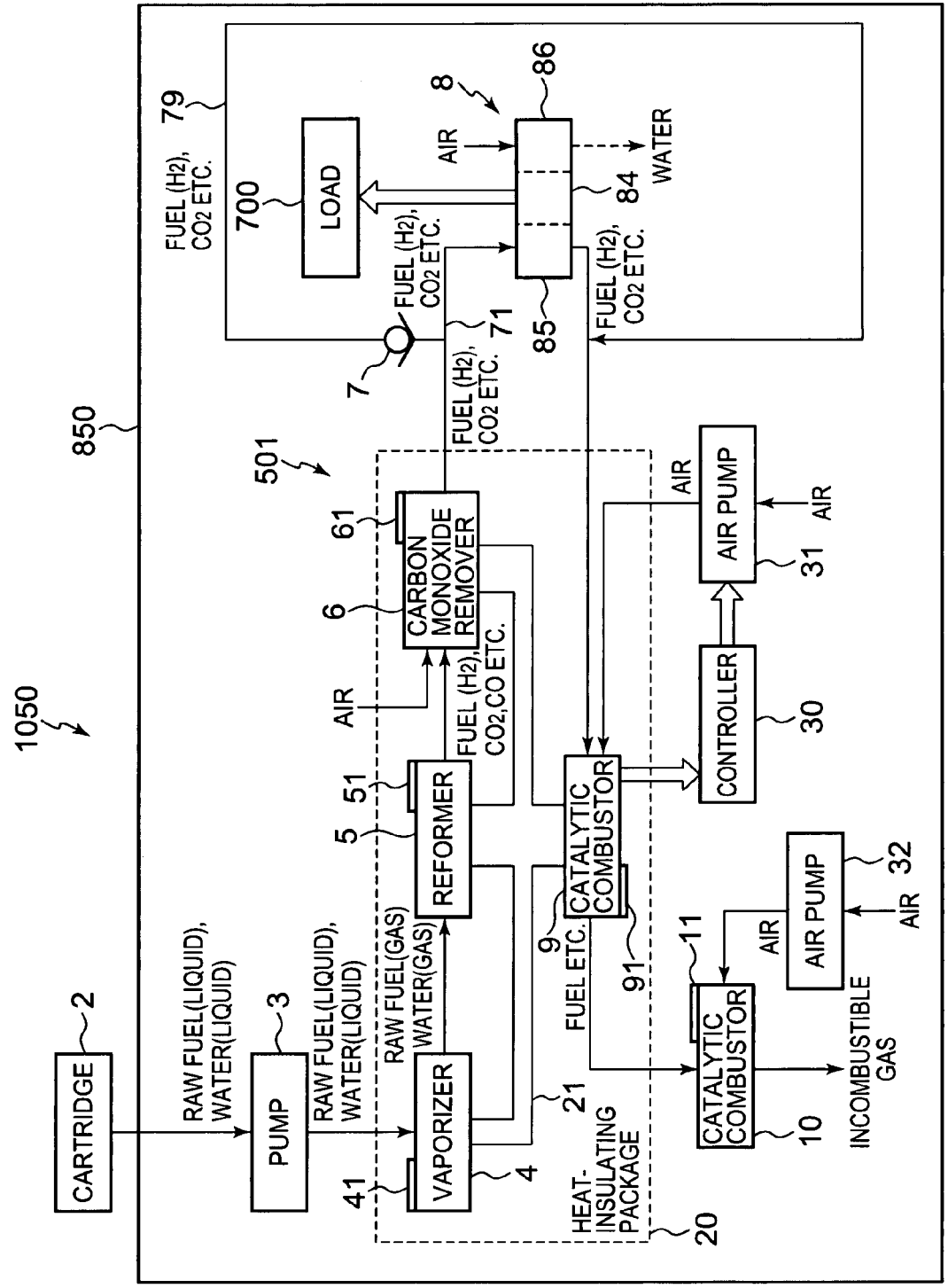

FIG. 8 is a block diagram showing electronic apparatus 1050 composed of a main body 850 of the electronic apparatus and the cartridge 2, the main body 850 including a fuel cell type power generation device 501 according to a fifth embodiment, the load 700 and the like. The fuel cell type power generation device 501 is provided with each constituent element of the fuel cell type power generation device 301 of the third embodiment. However, the pipe arrangement 79 is not connected to the second catalytic combustor 10, but is connected to the first catalytic combustor 9. Consequently, when the pressure of the reformed gas flowing through the pipe arrangement 71 becomes the predetermined value or more and the relief valve 7 opens, the surplus of the reformed gas flows from the relief valve 7 to the first catalytic combustor 9.

[Sixth Embodiment]

Figure 9:
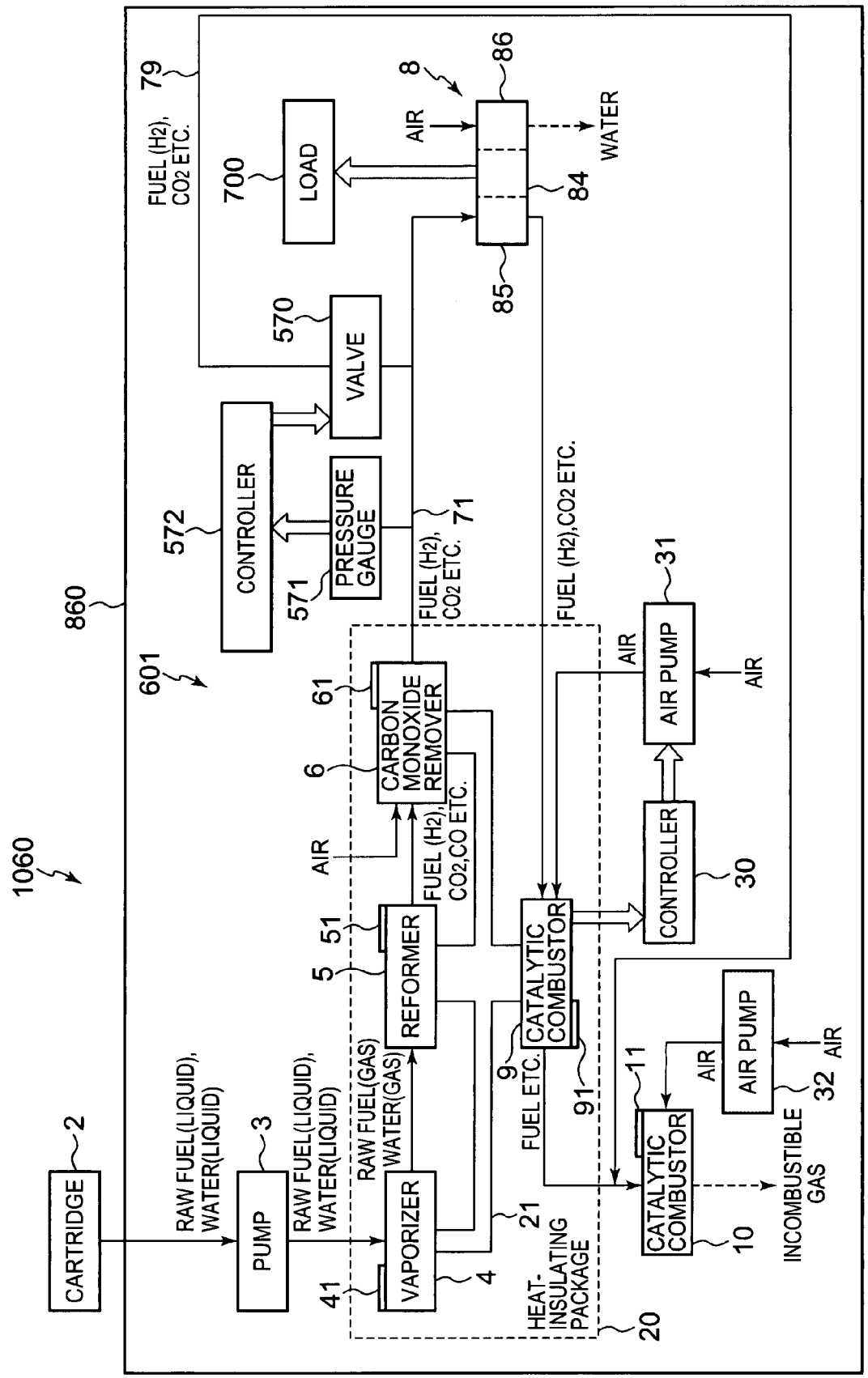

FIG. 9 is a block diagram showing electronic apparatus 1060 composed of a main body 860 of the electronic apparatus and the cartridge 2, the main body 860 including a fuel cell type power generation device 601 according to a sixth embodiment, the load 700 and the like. The fuel cell type power generation device 601 is provided with an electric control type active valve 570 performing opening and closing in accordance with an electric signal in place of the mechanical passive relief valve 7. The valve 570 opens to allow the flow of the reformed gas from the pipe arrangement 71 to the pipe arrangement 79, and closes to prevent the flow of the reformed gas from the pipe arrangement 71 to the pipe arrangement 79.

Furthermore, the fuel cell type power generation device 601 is provided with a pressure gauge 571 and a controller 572. The pressure gauge 571 measures the pressure of the reformed gas flowing through the pipe arrangement 71, and converts the measured pressure into an electric signal. The measured pressure by the pressure gauge 571 is transmitted to the controller 572 as the electric signal. The controller 572 includes the function of comparing the measured pressure by the pressure gauge 571 with a predetermined value, the function of opening the valve 570 when the measured pressure transferred from the pressure gauge 571 is the predetermined value or more as a result of the comparison, and the function of closing the valve 570 when the measured pressure transferred from the pressure gauge 571 is less than the predetermined value. The other constituent elements of the fuel cell type power generation device 601 are the same as those of the fuel cell type power generation device 301 of the third embodiment.

Because the measured pressure by the pressure gauge 571 is less than the predetermined value when the fuel cell 8 is operating in the stable power generation state, the controller 572 closes the valve 570. On the other hand, when the fuel cell 8 suddenly stops from the stable power generation state, or when the output of the fuel cell 8 suddenly drops owing to a load change, the measured pressure of the pressure gauge 571 becomes the predetermined value or more, the valve 570 opens by the controller 572, and the surplus of the reformed gas flowing through the pipe arrangement 71 flows into the second catalytic combustor 10.

By adopting such a configuration, the pressure threshold value of opening and closing, the degree of opening and closing and the like can be freely changed.

With regard to also the fuel cell type power generation device 401 shown in FIG. 7 and the fuel cell type power generation device 501 shown in FIG. 8, an electric control type valve similar to the valve 570 may be provided in place of the relief valve 7, and a controller may control the electric control type valve similarly to the controller 572.

Although the relief valve 7 and the valve 570 have been provided between the carbon monoxide remover 6 and the fuel cell 8, the relief valve 7 and the valve 570 may be provided at any place between the reformer 5 and the fuel cell 8. For example, the relief valve 7 and the valve 570 may be provided between the reformer 5 and the carbon monoxide remover 6.

The present U.S. patent application claims priorities under the Paris Convention of Japanese patent applications No. 2006-085579 filed on Mar. 27, 2006 and No. 2006-090941 filed on Mar. 29, 2006, and is entitled to the benefit thereof for a basis of correction of an incorrect translation.

What is claimed is:

1. A fuel cell type power generation device comprising:
   a fuel cell for extracting electric power by an electrochemical reaction of a fuel;
   a first combustor for burning an unreacted fuel exhausted from the fuel cell;
   a second combustor for burning an unburned fuel exhausted from the first combustor;
   a reformer for producing the fuel by reforming a raw fuel and sending the produced fuel to the fuel cell;
   a heat-insulating package for containing the reformer and the first combustor;
   a first pump for supplying a gas containing an oxidizer to the first combustor;
   a second pump for supplying the gas containing the oxidizer to the second combustor;
   a controller programmed to control a supply quantity of the gas containing the oxidizer to be supplied by at least one of the first pump and the second pump; and
   a heat conduction member for conducting heat of the first combustor to the reformer;
   wherein the second combustor is provided on an outside of the heat-insulating package; and
   wherein the controller is programmed to perform control such that:
   the first pump supplies only a certain quantity of the gas containing the oxidizer to the first combustor, the certain quantity of the gas being less than a quantity for burning all of the unreacted fuel exhausted from the fuel cell;
   the second pump supplies a sufficient quantity of the gas containing the oxidizer to the second combustor, the sufficient quantity of the gas being a quantity for burning all of the unburned fuel exhausted from the first combustor;
   when a supply quantity of the raw fuel to the reformer decreases, the first pump decreases the supply quantity of the gas containing the oxidizer to be supplied to the first combustor; and
   when the supply quantity of the raw fuel to the reformer increases, the first pump increases the supply quantity of the gas containing the oxidizer to be supplied to the first combustor.

2. The fuel cell type power generation device as claimed in claim 1, further comprising:
   a valve intervening between the reformer and the fuel cell to exhaust a reformed gas sent from the reformer to the fuel cell when a pressure of the reformed gas becomes equal to or greater than a predetermined value.

3. The fuel cell type power generation device as claimed in claim 2, wherein the valve is a relief valve that is mechanically operable by the pressure of the reformed gas sent from the reformer to the fuel cell.

4. The fuel cell type power generation device as claimed in claim 2, further comprising:
   a pressure gauge for measuring the pressure of the reformed gas sent from the reformer to the fuel cell;
   wherein the controller is programmed to perform control to (i) exhaust the reformed gas to be sent from the reformer to the fuel cell from the valve when the pressure measured by the pressure gauge becomes equal to or greater than the predetermined value, and (ii) stop the exhausting of the reformed gas from the valve when the pressure measured by the pressure gauge becomes less than the predetermined value.

5. The fuel cell type power generation device as claimed in claim 2, wherein the reformed gas exhausted from the valve is supplied to the second combustor.

6. The fuel cell type power generation device as claimed in claim 2, further comprising a third combustor provided on the outside of the heat-insulating package, wherein the reformed gas exhausted from the valve is supplied to the third combustor.

7. The fuel cell type power generation device as claimed in claim 2, wherein the reformed gas exhausted from the valve is supplied to the first combustor.

8. The fuel cell type power generation device as claimed in claim 1, further comprising:
   a temperature sensor for measuring a temperature of the first combustor;

wherein the controller is programmed to control the supply quantity of the gas containing the oxidizer by the first pump, in accordance with the temperature measured by the temperature sensor.

9. The fuel cell type power generation device as claimed in claim 8, wherein the controller is programmed to increase the supply quantity of the gas containing the oxidizer by the first pump to be more than a predetermined quantity when the measured temperature is less than a predetermined value, and to decrease the supply quantity of the gas containing the oxidizer by the first pump to be less than the predetermined quantity when the measured temperature is higher than the predetermined value.

10. An electronic apparatus, comprising:
a fuel cell for extracting electric power by an electrochemical reaction of a fuel;
a first combustor for burning an unreacted fuel exhausted from the fuel cell;
a second combustor for burning an unburned fuel exhausted from the first combustor;
a reformer for producing the fuel by reforming a raw fuel and sending the produced fuel to the fuel cell;
a heat-insulating package for containing the reformer and the first combustor;
a first pump for supplying a gas containing an oxidizer to the first combustor;
a second pump for supplying the gas containing the oxidizer to the second combustor;
a controller programmed to control a supply quantity of the gas containing the oxidizer to be supplied by at least one of the first pump and the second pump;
a heat conduction member for conducting heat of the first combustor to the reformer; and
a main body of the electronic apparatus that is operable by the electric power extracted by the fuel cell;
wherein the second combustor is provided on an outside of the heat-insulating package; and
wherein the controller is programmed to perform control such that:
the first pump supplies only a certain quantity of the gas containing the oxidizer to the first combustor, the certain quantity of the gas being less than a quantity for burning all of the unreacted fuel exhausted from the fuel cell;
the second pump supplies a sufficient quantity of the gas containing the oxidizer to the second combustor, the sufficient quantity of the gas being a quantity for burning all of the unburned fuel exhausted from the first combustor;
when a supply quantity of the raw fuel to the reformer decreases, the first pump decreases the supply quantity of the gas containing the oxidizer to be supplied to the first combustor; and
when the supply quantity of the raw fuel to the reformer increases, the first pump increases the supply quantity of the gas containing the oxidizer to be supplied to the first combustor.

11. The electronic apparatus as claimed in claim 10, further comprising:
a temperature sensor for measuring a temperature of the first combustor;
wherein the controller is programmed to control the supply quantity of the gas containing the oxidizer by the first pump, in accordance with the temperature measured by the temperature sensor.

12. The fuel cell type power generation device as claimed in claim 1, wherein the controller is programmed to control the first pump to supply, as the certain quantity of the gas containing the oxidizer to be supplied to the first combustor, a quantity of the gas for burning all of the fuel generated during a time of stationary power generation of the fuel cell at a predetermined temperature.

13. The fuel cell type power generation device as claimed in claim 1, wherein a gas exhausted from the second combustor is discharged to an outside of the fuel cell type power generation device.

14. The fuel cell type power generation device as claimed in claim 6, wherein the third combustor is provided to be adjacent to the second combustor and is thermally contacted with the second combustor.

15. The fuel cell type power generation device as claimed in claim 1, further comprising a vaporizer for vaporizing a liquid mixture containing the raw fuel, when the liquid mixture is sent to the reformer,
wherein the first combustor comprises a combustor for the reformer, and a third combustor for the vaporizer is separately provided.

* * * * *